United States Patent

Katyal et al.

[11] Patent Number: 5,350,440
[45] Date of Patent: Sep. 27, 1994

[54] FURNACE WITH DEFLECTING SURFACE AND METHOD OF CHARGING METAL SOLIDS

[75] Inventors: Anil Katyal; Warwick N. Brown, both of Birmingham; Roger Howitt, Nottingham, all of United Kingdom

[73] Assignee: Cookson Group PLC, London, United Kingdom

[21] Appl. No.: 107,244

[22] Filed: Aug. 16, 1993

[30] Foreign Application Priority Data

Aug. 21, 1992 [GB] United Kingdom ............... 9217802

[51] Int. Cl.$^5$ .................... C22B 9/16; C22B 21/00
[52] U.S. Cl. .................... 75/686; 75/687; 75/708; 266/229; 266/233; 266/234; 266/901
[58] Field of Search .................... 75/708, 686, 687; 266/229, 233, 234, 901

[56] References Cited

U.S. PATENT DOCUMENTS

| | | | |
|---|---|---|---|
| 4,060,408 | 11/1977 | Kuhn | 75/68 |
| 4,386,956 | 6/1983 | Roth et al. | 75/24 |
| 4,572,485 | 2/1986 | Engelberg et al. | 266/901 |
| 4,580,768 | 4/1986 | Roggen | 266/233 |
| 4,592,658 | 6/1986 | Claxton | 366/265 |
| 4,884,786 | 12/1989 | Gillespie | 266/235 |

FOREIGN PATENT DOCUMENTS

| | | |
|---|---|---|
| 0120684A1 | 10/1984 | European Pat. Off. . |
| 2672620A1 | 8/1992 | France . |
| WO83/02958 | 9/1983 | PCT Int'l Appl. . |
| 2072819A | 10/1981 | United Kingdom . |
| 2212603A | 7/1989 | United Kingdom . |

*Primary Examiner*—Melvyn J. Andrews
*Attorney, Agent, or Firm*—Westman, Champlin & Kelly

[57] ABSTRACT

A furnace (1) has a main holding (2) and a charging well (4) into which molten metal from the holding portion is circulated by means of an electromagnetic pump (7). Metal enters the well as a tangential flow and a stationary turbulator (10) is located in the path of the flow so as to upwardly and transversely deflect the flow. Resulting turbulence within the well enhances the rate of assimilation of solids into the melt without resulting in excessive oxidation. The method is suitable for melting aluminium swarf.

22 Claims, 5 Drawing Sheets

FURNACE WITH DEFLECTING SURFACE AND METHOD OF CHARGING METAL SOLIDS

BACKGROUND OF THE INVENTION

This invention relates to a furnace and to a method of melting metal solids in a furnace, and in particular but not exclusively to a method of charging aluminum swarf in a furnace.

The charging of metal solids into a furnace in a manner which is both efficient and environmentally acceptable presents particular difficulties when the metal solids to be charged are in the form of finely divided aluminum scrap such as industrial swarf having a relatively large surface area. The surface oxide layer on the aluminium solids is resistant to incorporation of the solids into a body of molten metal and creates surface dross which must be separated and removed.

It is known to provide a holding portion of a furnace in which a body of molten metal is heated within an enclosure within which controlled combustion inhibits oxidisation of the molten metal. Metal solids are introduced in a well annexed to the holding portion of the furnace and molten metal is transferred between the holding portion and the well in order to both maintain the temperature of metal in the well and to deliver fresh metal to the holding portion.

It is also known from U.S. Pat. No. 4884786 to provide for mechanical stirring of the molten metal within the well in order to assist the rate of assimilation of solids into the liquid phase within the well. Such stirring however has the disadvantage of enhancing the rate at which molten metal within the well is oxidised by contact with air. The stirring operation is itself problematic in that the stirring implements must be formed of materials capable of withstanding the required operating temperature which materials tend to be brittle and therefore require frequent replacement.

It is also known from GB-2072819-A to avoid the need for stirring implements by supplying pumped metal to the well through a tangential channel to create a vortex and to disrupt the vortex by a further flow from radial channel entering the well at a lower level. A resulting roll-over effect is said to aid ingestion. The elevated level at which the tangential channel pours metal into the well is however likely to result in a pouring effect which will enhance the rate of oxidation. The use of alternative melting media such as molton salt reduces the rate of oxidation but has the disadvantage that the subsequent disposal of such media in an environmentally acceptable manner is costly.

It is an object of the present invention to accelerate the process of assimilation of metal solids into the liquid phase.

It is a further object of the present invention to minimise the extent to which molten metal is oxidised during the process of assimilating metal solids into the liquid phase.

It is a further object of the present invention to avoid the use of stirring implements in the charging well.

SUMMARY OF THE INVENTION

According to the present invention there is disclosed a method of charging metal solids into a body of molten metal in a furnace comprising the step of heating a body of molten metal in a holding portion of the furnace, transferring metal from the holding portion to a well annexed to the holding portion such that a flow of metal enters the well beneath the surface of metal in the well, feeding the metal solids into contact with the surface of molten metal in the well and returning molten metal from the well into the holding portion, the method including the step of creating turbulence in the flow within the well by means of a stationary turbulator located in the path of the flow.

An advantage of such a method is that the resulting turbulence tends to speed up the process of assimilation of the metal solids into the liquid phase without resulting in unacceptable levels of oxidation.

Preferably the turbulator deflects the flow by means of at least a first deflecting surface so as to impart at least a component of motion in an upward direction.

Agitation of the surface by ripples is observed to occur in the presence of such a turbulator and this is indicative of there being turbulence in the metal near the surface. The surface disturbance is believed to assist the process of introducing metal solids into the liquid phase. The extent to which the surface is disrupted is however insufficient to cause excessive oxidation.

Preferably the first deflecting surface also deflects the flow so as to impart a horizontal component of motion.

Preferably the turbulator further deflects the flow by means of a second deflecting surface located downstream of the first deflecting surface with respect to the flow and which is more steeply inclined to the horizontal than the first deflecting surface.

Conveniently the metal is transferred into the well so as to enter the well through an inlet conduit tangentially relative to an internal cylindrical wall of the well to thereby establish circumferential circulation.

This circulation assists mixing of the metal within the well to maintain an even temperature.

Preferably the metal flows into the well from the inlet conduit through an inlet aperture located immediately adjacent to a floor of the well. In a preferred embodiment the well has a cylindrical internal surface with a horizontal floor.

Preferably the method includes the step of collecting surface dross at a location upstream of the inlet aperture with respect to the flow by means of a baffle projecting inwardly of the cylindrical internal wall of the well.

Conveniently metal is transferred from the holding portion to the well by means of an electromagnetic pump.

The method has particular application to the charging of aluminium swarf.

According to a further aspect of the present invention there is disclosed apparatus for charging metal solids into a body of molten metal in a furnace comprising a well annexed to a holding portion of the furnace, heating means operable to heat molten metal in the holding portion, transferral means operable to transfer metal through an inlet conduit to the well such that a flow of metal enters the well beneath the surface of the metal in the well, returning means for returning molten metal from the well to the holding portion and means for feeding metal solids into contact with the surface of molten metal in the well wherein the well further comprises a turbulator located in the path of the flow of molten metal in the well.

Preferably the turbulator comprises at least a first upwardly inclined deflecting surface arranged to impart to the flow at least an upward component of motion to thereby cause agitation of the surface of molten metal.

Advantageously the first deflecting surface is laterally inclined so as to impart to the flow a horizontal component of motion.

Advantageously the turbulator comprises a second deflecting surface located downstream of the first deflecting surface and which is more steeply inclined than the first surface.

An advantage of such an arrangement is to provide enhanced turbulence by progressively deflecting the flow.

Advantageously the inlet conduit communicates with the well through an inelt aperture located immediately adjacent to the floor of the well.

This arrangement avoids having the metal poured into the well in a manner likely to unnecessarily increase the rate of oxidation, the inflow of metal being at the bottom of the well.

Preferably the turbulator comprises a refractory block mounted on an internal surface of the well and defining at least one deflecting surface which is stationary relative to the internal surface.

Such a turbulator thereby achieves turbulence in a controlled manner without involving any moving parts within the well.

Advantageously the apparatus comprises a baffle projecting inwardly of the cylindrical internal surface of the well at a location upstream of the inlet conduit with respect to the circumferential flow, the baffle projecting upwardly above the surface of molten metal to define an area of the surface in which surface dross is collected in use.

Conveniently the apparatus comprises an electromagnetic pump connected between the holding portion and the inlet conduit.

Embodiments of the present invention will now be disclosed by way of example only and with reference to the accompanying drawings.

DESCRIPTION OF THE PREFERRED EMBODIMENTS

Figure 1:
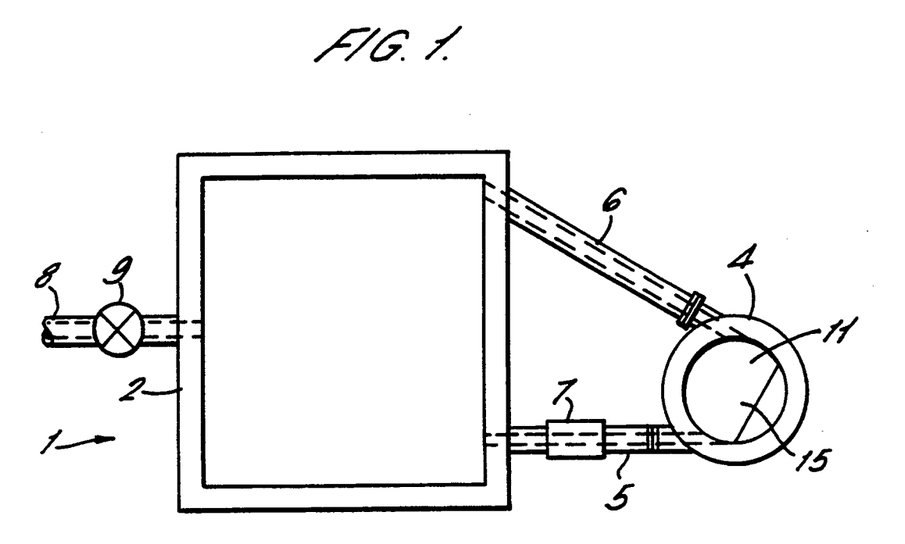
FIG. 1 is a schematic plan view of an empty furnace constructed in accordance with the present invention.
Figure 2:
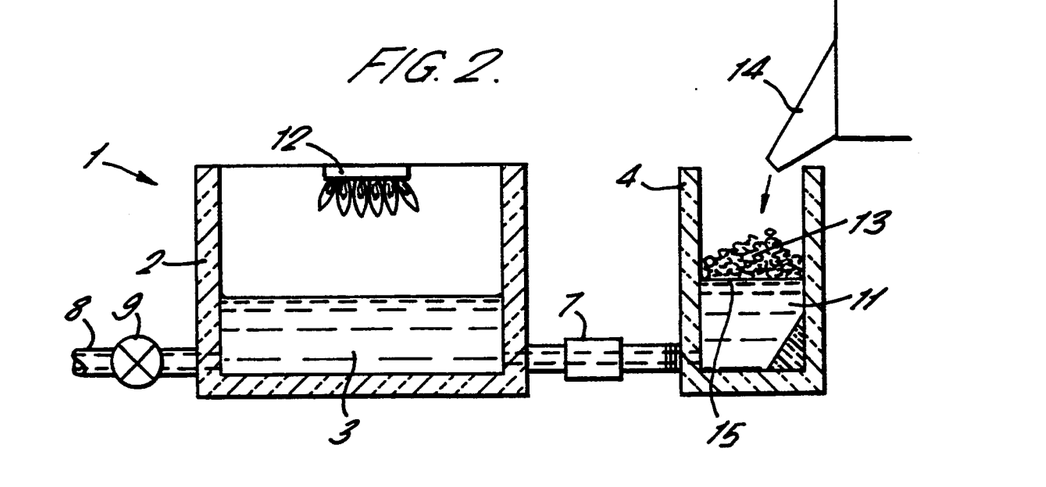
FIG. 2 is a schematic sectional elevation of the furnace of FIG. 1 when partially filled.

In FIGS. 1 and 2 a furnace 1 comprises a holding portion 2 containing a main body of molten metal 3 (not shown in FIG. 1). A well 4 is annexed to the holding portion 2 with which it communicates via an inlet conduit 5 and an outlet conduit 6.

The inlet conduit 5 is provided with an electromagnetic pump 7 operable to impel metal in a direction from the holding portion 2 towards the well 4.

The holding portion 2 is provided with an outlet 8 regulated by an outlet valve 9.

A stationary turbulator 10 is located in the well and is submerged beneath a body 11 of molten metal within the well.

As seen in FIG. 2 the holding portion 2 is provided with a gas burner 12 providing heat within the holding portion in the manner of a reverberatory furnace in which oxidisation of the main body of molten metal 3 is substantially prevented by controlled combustion provided by the gas burner.

Metal solids 13 in the form of swarf are deposited in the well 4 from a hopper 14 and an accumulation of metal solids rests in contact with a liquid surface 15 of the body of molten metal 11 within the well 4.

Figure 3:
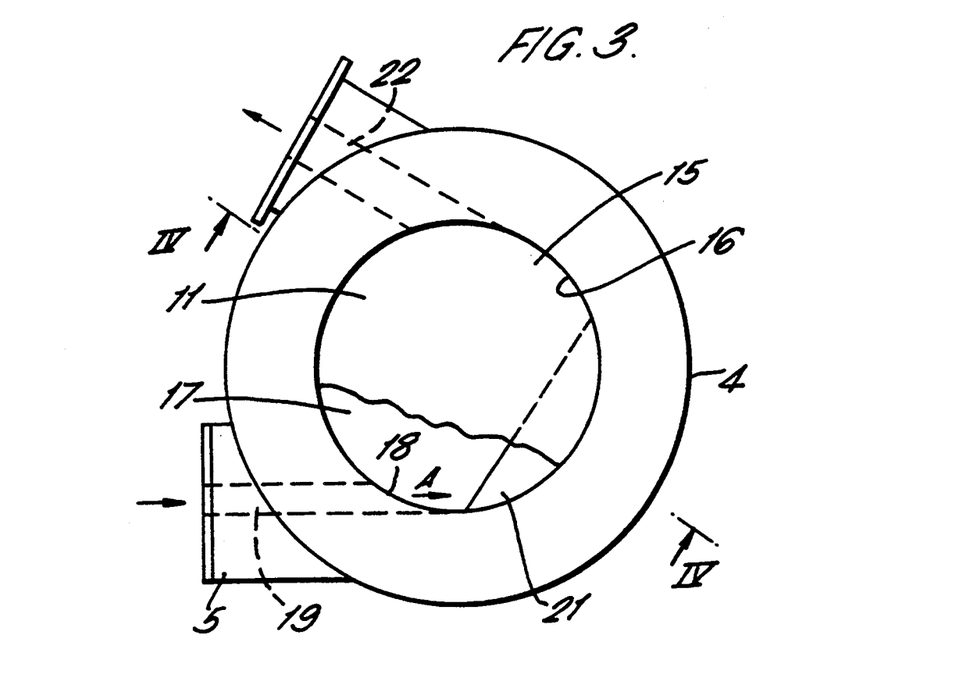
FIG. 3 is a sectional plan view of the well of the furnace of FIGS. 1 and 2.
Figure 4:
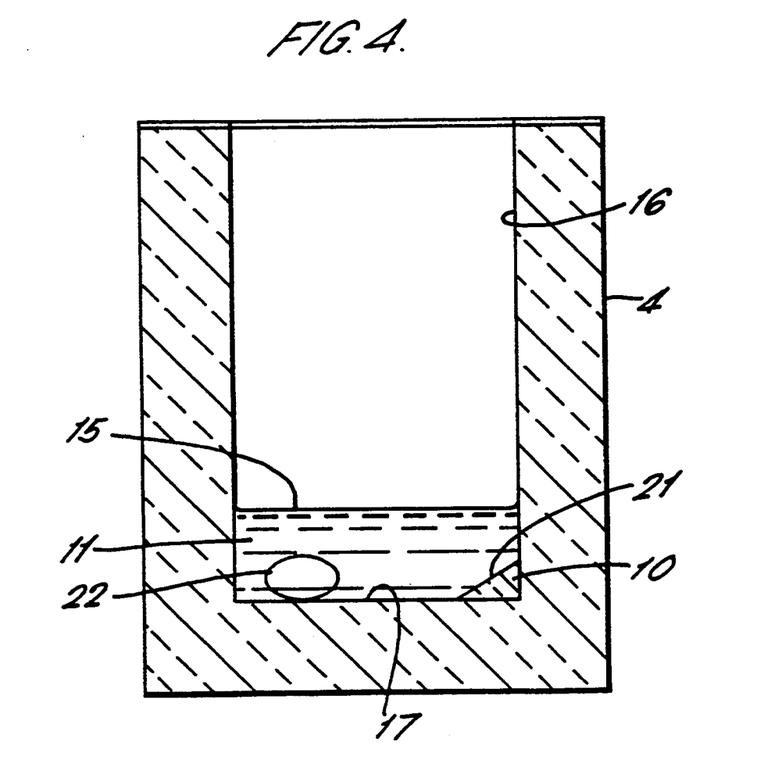
FIG. 4 is a vertical section of the well of FIG. 3 taken at IV—IV.

As shown in FIGS. 3 and 4 the well has an upright cylindrical internal surface 16 with a horizontal floor 17. In these FIGURES the metal solids 13 shown in FIG. 2 are omitted for clarity. The inlet conduit 5 communicates with the well via an inlet aperture 18 formed in the cylindrical internal surface 16 at a location which is immediately adjacent to the floor 17. The inlet conduit 5 defines a cylindrical bore 19 which extends horizontally and linearly such that the bore merges tangentially with the cylindrical internal surface 16. Molten metal impelled by the pump 7 is therefore directed into the well 4 so as to create a tangential flow indicated by arrow A in FIG. 3. The flow A enters the well 4 beneath the liquid surface 15 and tends to set up a circulating liquid flow within the well in an anti-clockwise direction as viewed in FIG. 3.

The turbulator 10 is located directly in the path of the flow A. The turbulator 10 consists of a moulded refractory block having a planar face 21 contacted by the body 11 of molten metal within the well, the face being inclined at an angle of 32° to the horizontal and intersecting both the floor 17 and the cylindrical surface 16 so as to obliquely truncate the internal cylindrical volume of the well.

As seen in FIG. 3 the face 21 is oriented such that in vertical projection the face is inclined at 45° to the flow A, and as shown in FIG. 4, when viewed in horizontal projection at right angles to the bore 19 the face 21 of the turbulator is upwardly inclined at 32°.

The effect of the turbulator 10 on the flow A is to impart both vertical and horizontal components of motion to the flow thereby disrupting the flow and creating turbulence. This turbulence results in ripples being formed on the surface 15 and vertical movement adjacent the surface.

As shown in FIG. 3 the outlet conduit 6 defines an outlet bore 22 which extends tangentially with respect to the cylindrical internal surface 16 in a direction such that the circulating flow urges molten metal through the bore to return into the main body of molten metal 3.

Metal solids 13 in contact with the surface 15 are heated by contact with the body of molten metal 11 within the well and are progressively assimilated into the liquid body. The oxide layer from the metal solids 13 is shed to form surface dross (not shown) which can be collected and removed at the end of melting a batch of metal solids.

The turbulence created within the body of molten metal 11 by the turbulator 10 has been found to speed up the process of assimilation of the metal solids into the liquid phase and this is believed to be partly due to the effect of agitation caused by the ripples on the liquid surface and partly due to the sheering effect of turbulence within the body of liquid assisting the separation of oxide layer from the metal.

A modified furnace will now be described with reference to FIGS. 5 and 6 using reference numerals corresponding to those of previous FIGURES where appropriate for corresponding elements.

Figure 5:
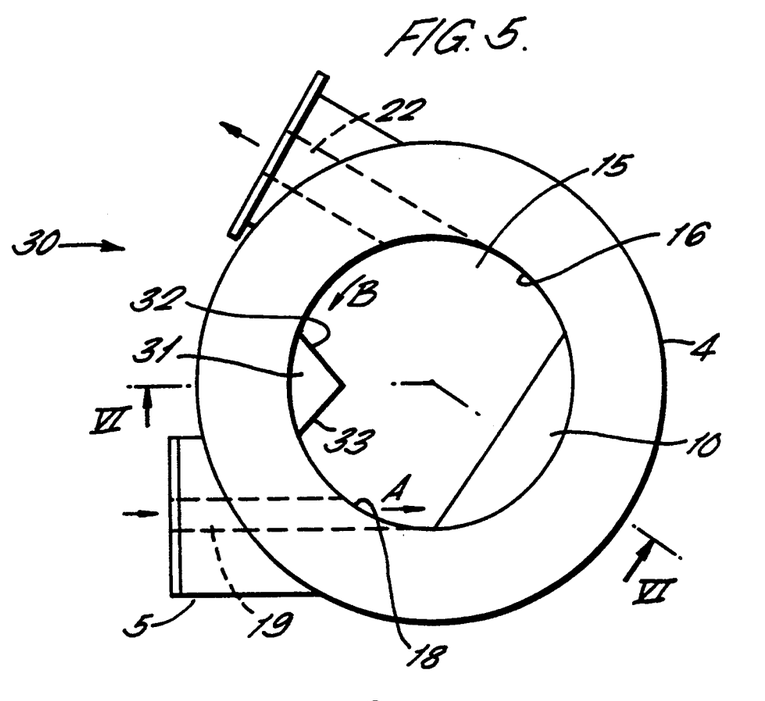
FIG. 5 is a plan view of a well of a second embodiment of the present invention.
Figure 6:
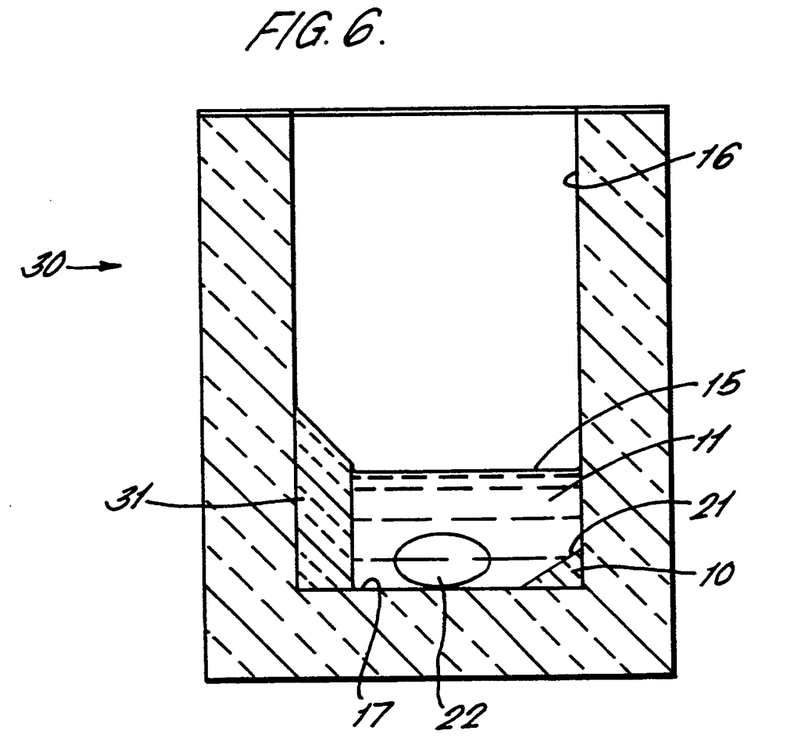
FIG. 6 is a staggered sectional elevation of the well of FIG. 5 taken at VI—VI.

The modified furnace of FIGS. 5 and 6 has a holding portion 2 corresponding to that of FIG. 1 and a well 30 as shown in the FIGURES.

The well 30 includes a turbulator 10 and also a baffle 31 which projects inwardly of the internal cylindrical surface 16 at a location immediately adjacent the inlet aperture 18. The baffle 31 is positioned upstream of the inlet aperture 18 with respect to the anti-clockwise circulating flow within the well 4 and is intermediate the inlet and outlet conduits 5 and 6.

The baffle 31 is formed of a moulded refractory material and is shaped so as to have mutually orthogonal vertically extending first and second faces 32 and 33 which are symmetrically disposed about an imaginary plane extending radially from the cylindrical axis of the well 30.

The first vertical face 32 projects obliquely into the circumferential flow indicated by arrow B in FIG. 5 and projects upwardly above the molten metal surface 15. Dross floating on the surface 15 tends to accumulate in an area of the surface 15 immediately upstream of the first vertical face 32 with respect to the flow B and the accumulated dross is removed at the end of processing a batch of metal solids.

A further alternative furnace will now be described with reference to FIGS. 7, 8 and 9 using corresponding reference numerals to those of preceding FIGURES where appropriate for corresponding elements.

Figure 7:
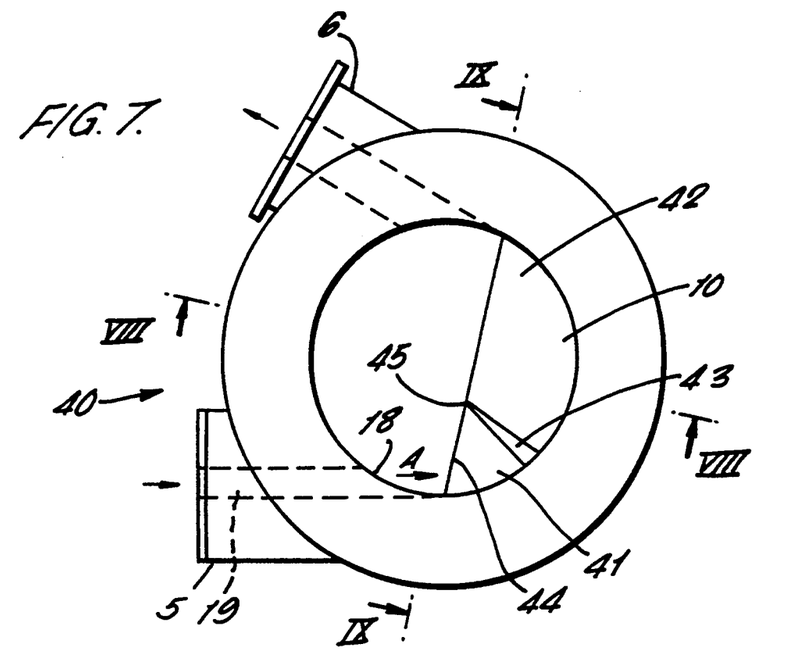
FIG. 7 is a plan view of a well of a third embodiment of the present invention when empty.
Figure 8:
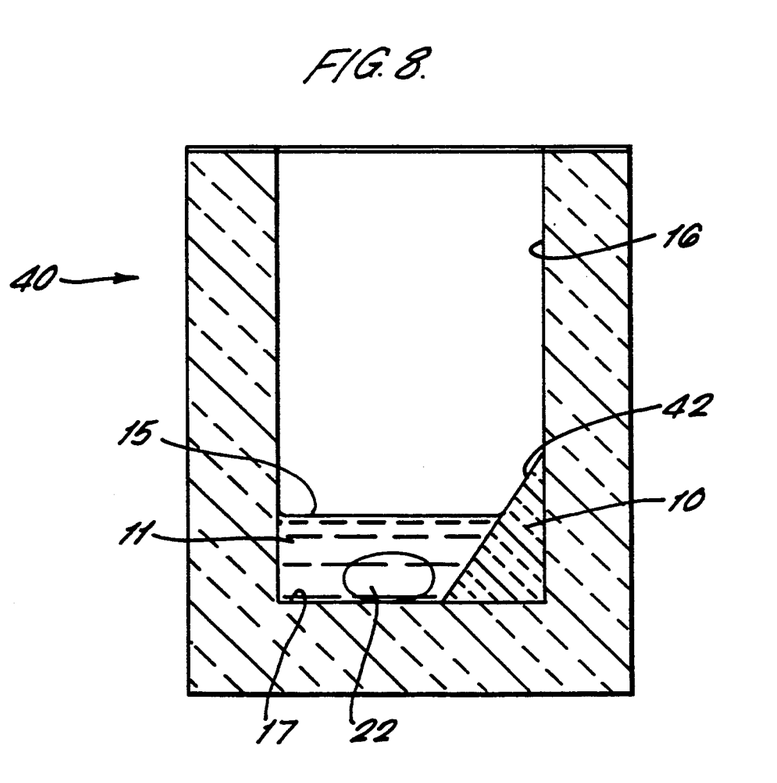
FIG. 8 is a vertical section of the well of FIG. 7 taken at VIII—VIII.
Figure 9:
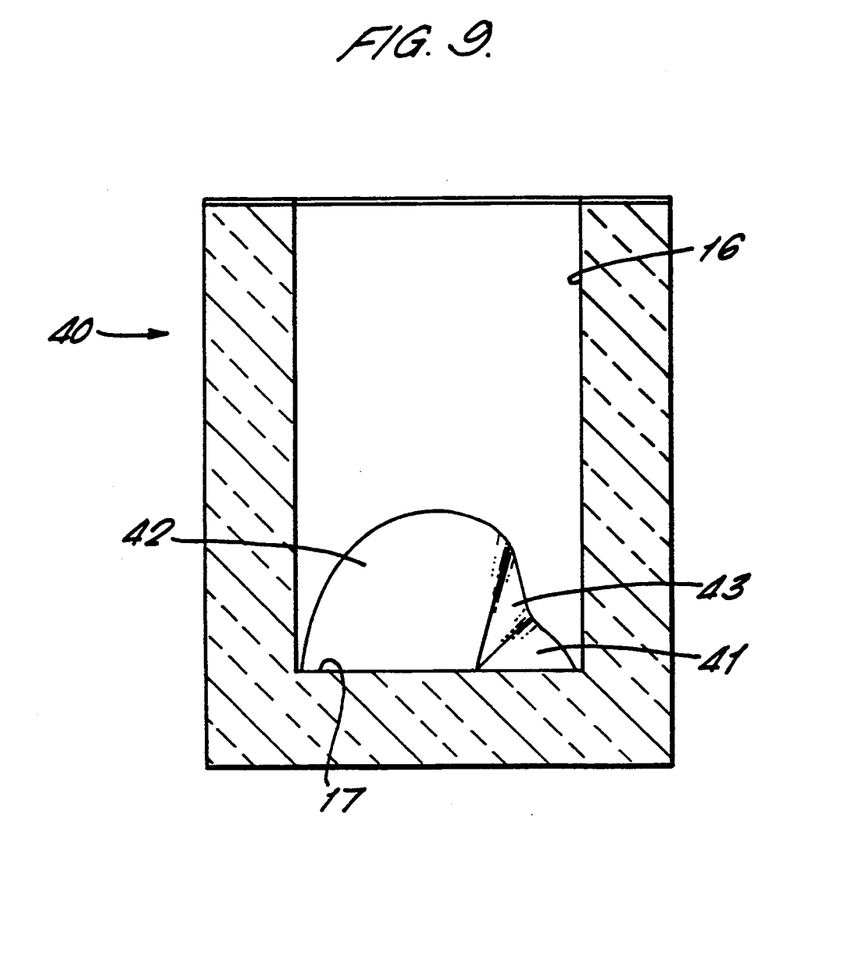
FIG. 9 is a further vertical section of the well of FIG. 7 when empty taken at IX—IX.

The furnace shown in FIGS. 7, 8 and 9 has a modified well 40 having a turbulator 10 with first and second planar surfaces 41 and 42 respectively which are inclined at 32° and 55° respectively to the horizontal. The first and second planar surfaces 41 and 42 are connected by a triangular surface portion 43 which is shaped so as to merge smoothly with each of these respective surfaces.

The first planar surface 41 is located in the path of the flow A emerging from the inlet aperture 18 so as to tend to divert the flow A in both upward and radially inward directions.

The first planar surface 41 intersects the floor 17 in a line of intersection 44 which extends at an angle of about 75° to the flow A. The second planar surface 42 intersects the floor 17 co-linearly with the line of intersection 44 such that the surfaces 41 and 42 are joined together at a point of intersection 45.

The flow A encounters the first planar surface 41 of the turbulator 10, then encounters the more steeply inclined triangular surface portion 43 and finally encounters the second planar surface 42. The complex gradient profile provided by the turbulator 10 in the furnace of FIGS. 7 to 9 thereby is thought to create more pronounced and disruptive turbulence in the flow compared with the turbulators of preceding FIGURES.

Alternative embodiments of the present invention are envisaged in which for example the electromagnetic pump is replaced by a mechanical impeller pump.

The method of heating metal in the holding portion may be other than by gas combustion and may for example comprise inductive heating. The method and apparatus of the present invention may be utilised for processing metal solids other than swarf. Finely divided solids such as obtained from recycling processes also present similar difficulties when charging into a furnace and the present method and apparatus similarly provides the above advantages.

Larger metal solids may also be added to the well if required and typically will be fed into the well at the end of a batch during which more finely divided solids are initially charged.

The present method and apparatus may have application to metals other than aluminium.

The method and apparatus of the present invention may also be used in a metal refining process.

We claim:

1. A method of charging metal solids into a body of molten metal in a furnace comprising the step of heating a body of molten metal in a holding portion of the furnace, transferring metal from the holding portion to a well annexed to the holding portion such that a flow of metal entes the well beneath the surface of metal in the well, feeding the metal solids into contact with the surface of molten metal in the well and returning molten metal from the well into the holding portion, the method including the step of creating turbulence in the flow within the well by means of a stationary turbulator located in the path of the flow and wherein the turbulator deflects the flow by means of at least a first deflecting surface which is upwardly inclined so as to impart to the flow at least a component of motion in an upward direction.

2. A method as claimed in claim 1 wherein the first deflecting surface is also laterally inclined whereby the first deflecting surface deflects the flow so as to impart to the flow a horizontal component of motion.

3. A method as claimed in claim 1 wherein the turbulator further deflects the flow by means of a second deflecting surface located downstream of the first reflecting surface with respect to the flow and which is more steeply inclined to the horizontal than the first deflecting surface 4. A method as claimed in claim 1 in which the metal is transferred into the well through an inlet so as to enter the well tangentially relative to an internal cylindrical wall of the well and whereby the flow established in the well is vortical 5. A method as claimed in claim 4 wherein the metal flows into the well from the inlet conduit through an inlet aperture located immediately adjacent to a floor of the well.

6. A method as claimed in claim 5 including the step of collecting surface dross at a location upstream of the inlet aperture with respect to the direction of flow by means of a baffle projecting inwardly of the cylindrical internal wall of the well.

7. A method as claimed claim 1 wherein metal is transferred between the holding portion and the well by means of an electromagnetic pump.

8. A method as claimed in claim 1 wherein the metal is aluminium.

9. A method as claimed in claim 1 wherein the solids are in the form of swarf.

10. Apparatus for charging metal solids into a body of molten metal in a furnace comprising a well annexed to a holding portion of the furnace, heating means operable to heat molten metal in the holding portion, transferral means operable to transfer metal between the holding portion and the well such that in use a flow of metal enters the well beneath the surface of the metal in the well via an inlet conduit, means for feeding metal solids into contact with the surface of molten metal in the well and returning means for returning molten metal from the well to the holding portion, wherein the well further comprises a turbulator located in the path of the flow of molten metal in the well and wherein the turbulator comprises at least a first upwardly inclined deflecting surface arranged to impart to the flow at least an upward component of motion.

11. Apparatus as claimed in claim 10 wherein the first deflecting surface is laterally inclined so as to impart to the flow a horizontal component of motion.

12. Apparatus as claimed in claim 10 wherein the turbulator comprises a second deflecting surface located downstream of the first deflecting surface with respect to the flow and which is more steeply inclined to the horizontal than the first surface.

13. Apparatus as claimed in claim 10 wherein the well comprises a cylindrical internal surface extending upwardly from a floor and wherein the first deflecting surface intersects the floor and the cylindrical surface so as to obliquely truncate the internal cylindrical volume of the well.

14. Apparatus as claimed in claim 10 wherein the inlet conduit extends non-radially with respect to the cylindrical internal surface of the well so that in use the transfer of metal into the well creates a flow which enters tangentially.

15. Apparatus as claimed in claim 14 wherein the inlet conduit communicates with the well through an inlet aperture located immediately adjacent to the floor of the well.

16. Apparatus as claimed in claim 15 wherein the well comprises a baffle projecting inwardly of the cylindrical internal surface of the well at a location upstream of the inlet aperture with respect to the direction of flow, the baffle projecting upwardly above the surface of molten metal to define an area of the surface in which surface dross is collected in use.

17. Apparatus as claimed in claim 10 wherein the turbulator comprises a refractory block mounted on an internal surface of the well and defining at least one deflecting surface which is stationary relative to the internal surface.

18. Apparatus as claimed in claim 10 wherein the transferral means comprises an electromagnetic pump.

19. Apparatus as claimed in claim 10 comprising an outlet conduit connected to the well downstream of the turbulator and communicating with the holding portion for returning molten metal.

20. A method of charging metal solids into a body of molten metal comprising the step of circulating the molten metal within a charging well to create a vortical flow of molten metal, deflecting the flow upwardly towards a liquid surface of the molten metal by means of a stationary deflecting surface located in the path of the flow and feeding the metal solids into contact with the liquid surface.

21. A method of charging metal solids into a body of molten metal in a furnace comprising the step of heating a body of molten metal in a holding portion of the furnace, transferring metal from the holding portion to a wll annexed to the holding portion such that a flow of metal enters the well beneath the surface of metal in the well, feeding the metal solids into contact with the surface of molten metal in the well and returning molten metal from the well into the holding portion, the method including the step of creating turbulence in the flow within the well by means of a stationary turbulator located in the path of the flow, wherein the turbulator deflects the flow by means of a first deflecting surface which is upwardly inclined so as to impart to the flow at least a component of motion in an upward direction, and wherein the turbulator further deflects the flow by means of a second deflecting surface located downstream of the first deflecting surface with respect to the flow and which is more steeply inclined to the horizontal than the first deflecting surface.

22. Apparatus for charging metal solids into a body of molten metal in a furnace comprising a well annexed to a holding portion of the furnace, heating means operable to heat molten metal in the holding portion, transferral means operable to transfer metal between the holding portion and the well such that in use a flow of metal enters the well beneath the surface of the metal in the well via an inlet conduit, means for feeding metal solids into contact with the surface of molten metal in the well and returning means for returning molten metal from the well to the holding portion, further comprises a turbulator located in the path of the flow of molten metal in the well, wherein the turbulator comprises a first upwardly inclined deflecting surface arranged to impart to the flow at least an upward component of motion, and wherein the turbulator comprises a second deflecting surface located downstream of the first deflecting surface with respect to the flow and which is more steeply inclined to the horizontal than the first surface.

* * * * *

UNITED STATES PATENT AND TRADEMARK OFFICE
CERTIFICATE OF CORRECTION

PATENT NO. : 5,350,440
DATED : September 27, 1994
INVENTOR(S) : Anil Katyal, Warwick N. Brown and Roger Howitt It is certified that error appears in the above-indentified patent and that said Letters Patent is hereby corrected as shown below:

On the Title Page Under [73] Assignee:

Please cancel "Cookson Group PLC" and insert --Calder Aluminium Limited--.

Signed and Sealed this

Twenty-second Day of October, 1996

*Attest:*

BRUCE LEHMAN

*Attesting Officer*     *Commissioner of Patents and Trademarks*